United States Patent [19]
Justiss et al.

[11] Patent Number: 6,160,586
[45] Date of Patent: *Dec. 12, 2000

[54] DIGITAL VIDEO PROCESSING USING A DYNAMICALLY VARYING NUMBER OF VIDEO FIELDS

[75] Inventors: Steven A. Justiss, Lakeway; Giles A. Pauli, Austin, both of Tex.

[73] Assignee: VTEL Corporation, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/163,901

[22] Filed: Sep. 30, 1998

[51] Int. Cl.$^7$ .................................................. H04N 7/01
[52] U.S. Cl. ................................... 348/452; 348/581
[58] Field of Search ......................... 348/452, 448, 348/459, 699, 700, 581, 443

[56] References Cited

U.S. PATENT DOCUMENTS

| | | | |
|---|---|---|---|
| 4,868,655 | 9/1989 | Choquet et al. | 358/140 |
| 4,937,667 | 6/1990 | Choquet et al. | 358/140 |
| 4,989,090 | 1/1991 | Chambell et al. | 358/140 |
| 5,166,788 | 11/1992 | Lee | 358/105 |
| 5,225,907 | 6/1993 | Casavant et al. | 358/141 |
| 5,233,421 | 8/1993 | Chrisopher | 358/160 |
| 5,235,417 | 8/1993 | Casavant et al. | 358/105 |
| 5,329,317 | 7/1994 | Naimpally et al. | 358/620 |
| 5,386,237 | 1/1995 | Knee | 348/458 |
| 5,412,436 | 5/1995 | Christopher | 348/700 |
| 5,546,130 | 8/1996 | Hackett et al. | 348/447 |
| 5,619,271 | 4/1997 | Mancuso et al. | 348/448 |
| 5,642,170 | 6/1997 | Hackett et al. | 348/459 |
| 5,671,018 | 9/1997 | Ohara et al. | 348/452 |
| 5,838,385 | 11/1998 | Reder et al. | 348/448 |
| 5,864,367 | 1/1999 | Clatanoff et al. | 348/452 |
| 5,943,099 | 8/1999 | Kim | 348/452 |

OTHER PUBLICATIONS

Keith Jack; *Video Demystified: A Handbook for the Digital Engineer*; Second Edition, 1996; Chapter 9; pp. 386–425.

*Primary Examiner*—Victor R. Kostak
*Attorney, Agent, or Firm*—Skjerven, Morrill, MacPherson LLP; Michael P. Noonan

[57] ABSTRACT

A method of processing video information includes scaling the video information using a first number of fields if a field indicator indicates the first number of fields and scaling the video information using a second number of fields if the field indicator indicates the second number of fields. The video information is searched for motion. The field indicator is set to indicate the first number of fields if the video information includes a first amount of motion, and the field indicator is set to indicate the second number of fields if the video information includes a second amount of motion.

20 Claims, 3 Drawing Sheets

DIGITAL VIDEO PROCESSING USING A DYNAMICALLY VARYING NUMBER OF VIDEO FIELDS

BACKGROUND

1. Field of the Invention

The present invention relates to digital video processing, and, more particularly, to enhanced digital video processing using a dynamically varying number of video fields such as single and dual video field processing.

2. Description of the Related Art

Most video sources such as National Television Standards Committee (NTSC) or Phase Alternation Line (PAL) cameras supply interlaced video including two fields per video frame. Such interlaced video cameras capture one half of the vertical resolution in a first field, and the other half of the vertical resolution in a second field. The second field is temporally displaced from (e.g., later in time than) the first field. Thus, the two fields provide full vertical frame resolution, but the fields are temporally spaced at one-half of the frame rate time.

The video produced by video sources compliant with the NTSC or PAL standards also has a particular size. For example, the CCIR601 standard defines NTSC video having a size of 720 pixels by 480 lines, and PAL video having a size of 720 pixels by 576 lines.

Although most consumer video is interlaced, computer systems typically use noninterlaced, progressive scan, displays. Moreover, several commonly used communications and/or compression standards require that the video signal be transmitted in a progressively scanned format as opposed to an interlaced format, and at a common interface format size as opposed to the NTSC size or the PAL size. For example, the International Telecommunications Union (ITU) video compression standard ITU-T H.261 for video teleconferencing systems using ISDN lines, and the standard ITU-T H.263 for multimedia communications systems using conventional phone lines both provide for progressive scan video transmission at a 352 pixels by 288 lines common interface format. Other resolutions are supported by other standards.

Consequently, some form of size conversion and some form of interlaced-to-noninterlaced conversion are required. Size conversion is called scaling. Interlaced-to-noninterlaced conversion is called deinterlacing or progressive scan conversion. Common forms of deinterlacing include single field deinterlacing such as scan line duplication, scan line interpolation and dual field deinterlacing such as field merging.

Single field conversion is preferred for motion images, whereas dual field conversion is preferred for static images. Generally, scenes with high levels of motion content display fewer motion artifacts, and a higher quality motion image, when processed from one field, and scenes with low levels of motion content display higher vertical resolution when encoded from two fields.

Typically, a codec's encoder scales either one or both fields of a received video frame into a size appropriate for the video standard or proprietary format being implemented. The scaled frame is typically subdivided into arrays of pixels. Some video compression standards such as the aforementioned H.261 and H.263 define certain kinds of arrays as macroblocks. Such macroblocks are encoded from a progressive scan format and transmitted for decode on a receiving codec.

Many existing codecs are designed to exclusively scale either one field or two fields. Each implementation includes its inherent advantages and disadvantages. For example, codecs that scale both fields of an input video frame produce images which include a higher degree of vertical resolution and manifest a high quality static image. However, scaling from both fields inherently causes field-related motion artifacts. Conversely, codecs that scale from a single field produce images which do not include field related motion artifacts and therefore manifest a higher quality motion image. Unlike dual fields, a single field is temporally coherent and therefore does not have the field related motion artifacts. However, scaling from a single field produces images having an inherently lower quality static image than codecs scaling from both fields. Thus, a single-field-processing codec favors higher quality motion images, and a dual-field-processing codec favors higher quality low-motion images.

One proposal uses field merging for still areas of the picture and scan line interpolation for areas of movement. Such a solution is disclosed in Keith Jack, "Video Demystified," (2nd ed. 1996) (hereinafter, Jack), which is incorporated herein by reference. As disclosed in Jack, motion is detected on a pixel-by-pixel basis over the entire picture in real time. Motion is detected by comparing the luminance value of a pixel with the value two fields earlier. Since two fields are combined, and either or both may contain areas of motion, Jack discloses detecting motion between two odd fields and two even fields. Four field stores are therefore required.

The pixel differences may have any value, from 0 (no movement and noise-free) to maximum (for example, a change from full intensity to black). A choice must be made when to use a pixel from the previous field (which may be in the wrong location due to motion) or to interpolate a new pixel from adjacent scan lines in the current field. Jack teaches the use of crossfading (also called soft switching) between methods. At some magnitude of pixel difference, the loss of resolution due to a double image is equal to the loss of resolution due to interpolation. That amount of motion should result in the crossfader being at the 50/50 point. Less motion will result in a fade towards field merging and more motion in a fade towards the interpolated values. Such crossfading is performed on a pixel-by-pixel basis and is very compute intensive. Consequently, crossfading is costly to implement in terms of computing resources required to implement it and which are therefore unavailable to other applications as a result, and in terms of time for computations required.

SUMMARY

It has been discovered that a video codec can produce both higher quality (e.g., low motion artifact) high motion content images and higher resolution low motion content images by intelligently monitoring the motion content of previously encoded video and digitally processing subsequent video information using a dynamically varying number of fields depending on the detected motion content of the encoded video. For example, field-based scaling (e.g., scaling from one field) is used when low or no motion is detected, and frame-based scaling (e.g., scaling from two fields) is used when high motion is detected. Such a system and method provide the advantage that of higher quality motion images, and higher quality (higher resolution) low motion images within a single codec. Thus the end user can have higher quality images both with high motion content, and with low motion content.

In one embodiment, a method of processing video information includes scaling the video information using a first number of fields if a field indicator indicates the first number of fields and scaling the video information using a second number of fields if the field indicator indicates the second number of fields. The video information is searched for motion after scaling the video information. The field indicator is set to indicate the first number of fields if the video information includes a first amount of motion, and the field indicator is set to indicate the second number of fields if the video information includes a second amount of motion.

In another embodiment, a method of processing video information includes setting a field indicator to one of a first value indicating one field and a second value indicating two fields; receiving video formatted according to frames, each frame including a first field and a second field; processing a number of fields of a first frame of the video, the number of fields being dependent upon whether the field indicator has the first value or the second value; setting the field indicator to the first value if the video includes more than a first amount of motion; and setting the field indicator to the second value if the video includes less than the first amount of motion.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following detailed description is intended to be illustrative of at least one embodiment of the invention. Therefore, the detailed description should not be taken to be limiting of the invention itself. Rather, any number of variations may fall within the scope of the invention which is defined in the claims following the detailed description.

Figure 1:
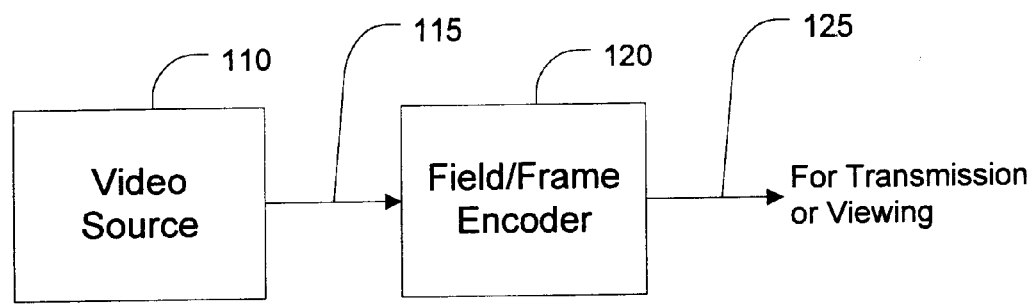
FIG. 1 shows a block diagram of one embodiment of a system for processing video information according to the invention.

FIG. 1 shows an information processing system 100 which processes video information in accordance with the invention. System 100 includes video source 110 and field/frame encoder 120. In one embodiment, video source 110 includes a memory for storing video information for at least one of successive frames of video. The video information is stored in lines of pixels. Video source 110 provides video to field/frame encoder 120 via coupling 115. Field/frame encoder 120 receives video from video source 110 and provides encoded video via coupling 125. As is described hereinafter, field/frame encoder 120 processes the video on a frame-by-frame basis or a field-by-field basis depending upon the amount of motion detected in the video.

Figure 2:
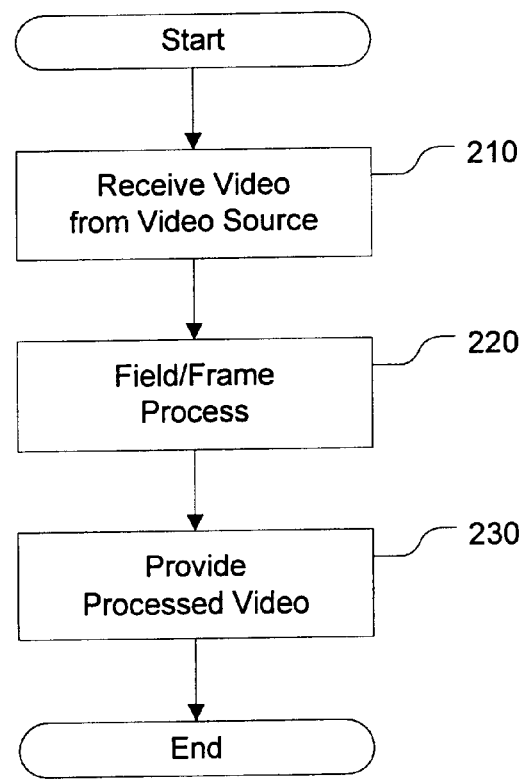
FIG. 2 shows a flow chart of one embodiment of a method of processing video information according to the invention.

The operation of exemplary system 100 may be more fully understood with reference to FIG. 2 which shows a method of processing video in accordance with the invention. During receive video operation 210, field/frame encoder 120 receives video from video source 110. After receive video operation 210 and during field/frame process operation 220, field/frame encoder 120 scales and encodes the video for transmission. After field/frame process operation 220 and during transmit operation 230, field/frame encoder provides the encoded video for display and/or for transmission to remotes sites, for example.

During field/frame process operation 220, field/frame encoder 120 scales video on a field-by-field basis or on a frame-by-frame basis depending on whether a sufficient number of motion vectors have been detected. Field/frame encoder 120 monitors the number of macroblocks in a frame of video which are found to contain motion and switches from scaling one field (e.g., field-by-field) to two fields (e.g., frame-by-frame) or vice versa based on a programmable threshold of macroblocks containing motion in a frame. If field/frame encoder 120 detects a sufficient amount of motion as compared to a threshold amount of motion, field/frame encoder 120 scales on a field-by-field basis to decrease motion artifacts. If field/frame encoder 120 detects an insufficient amount of motion as compared to the threshold amount of motion, field/frame encoder 120 scales on a frame-by-frame basis to increase resolution. For example, when scaling on a field-by-field basis, field/frame encoder 120 scales every line of one of the fields (e.g., every other line of the frame) stored in and/or received from video source 110. When scaling on a frame-by-frame basis, field/frame encoder 120 scales every line of the video information stored in and/or received from video source 110 without discarding either field.

Various exemplary operations of the above described field/frame process operation 220 are discussed hereinafter with reference to FIGS. 3A and 3B. Generally, after system initialization, video information is received, scaled using either one or two fields, and encoded (e.g., by using motion estimation techniques). The motion content of the video information is determined by examining motion vectors generated during the encoding of macroblocks of prior frames or a previous number of macroblocks. If enough video information has been processed, a total motion content value is compared with a threshold value to update a scaling technique trigger having hysteresis. If the hysteresis is overcome, a scaling technique flag is set. The scaling technique flag is used to reevaluate the type of scaling used (e.g., field-based scaling or frame-based scaling). If not enough video information has been processed, more video information is received for processing.

Figure 3A:
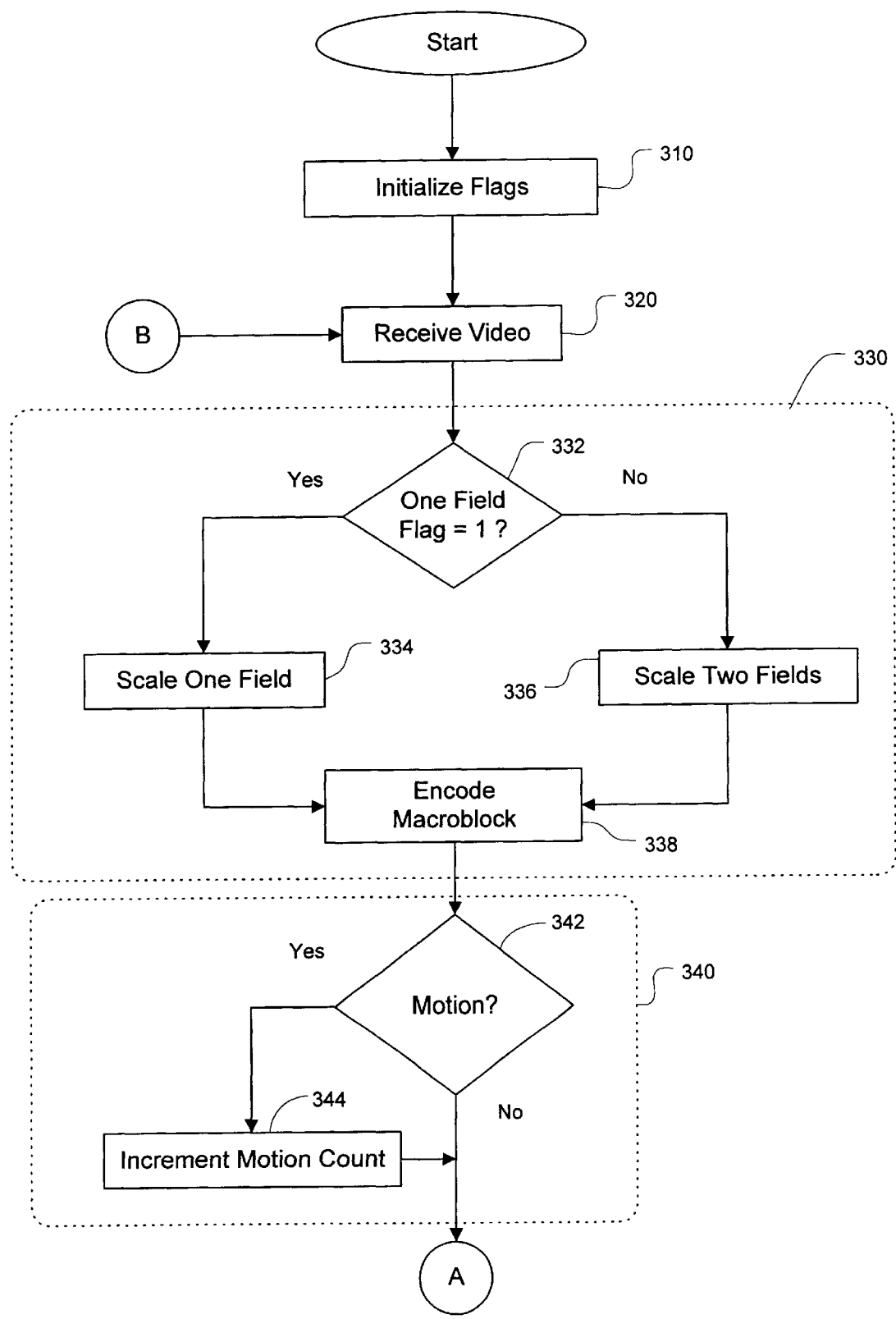
FIGS. 3A and 3B show a flow chart of one embodiment of a field/frame processing operation according to the invention.

Referring to FIG. 3A, during initialize operation 310, field/frame encoder 120 is initialized. For example, various indicators such as flags, counters, etc., for tracking/ identifying various states of the video being processed are initialized. One exemplary flag is a scaling technique flag referred to herein as the "one field flag" which directs field/frame encoder 120 to scale using one field or two fields. Also during initialize operation 310, a motion counter and a scaling technique trigger referred to herein as the "field mode trigger" are initialized to show that no video motion has been detected (e.g., zero macroblocks with detected motion).

After initialize operation 310 and during receive video information operation 320, field/frame encoder 120 receives interlaced video information from video source 110. For example, field/frame encoder 120 receives interlaced video information for a frame of video (e.g., both fields) encoding from an image having 704 pixels by 480 lines (NTSC) or 704 pixels by 576 lines (PAL).

After receive video information operation 320 and during process video information operation 330, the received video information is scaled and encoded for subsequent transmission. Specifically, during one field flag decision 332, field/frame encoder 120 determines if the one field flag is set to indicate one field scaling (e.g., one field flag=1). If the one field flag indicates one field scaling, control transitions to scale one field operation 334. If the one field flag does not indicate one field scaling, control transitions to scale two fields operation 336. Exemplary field/frame encoder 120 includes a multi-tap filter to scale the video from an interlaced NTSC-sized image to a progressively scanned image having a common interface format (CIF) size of 352 pixels by 288 lines. Each scaling operation includes deinterlacing and size scaling when appropriate. In embodiments without size scaling, each scaling operation may include deinterlacing. After either one of scale one field operation 334 and scale two fields operation 336, control transitions to encode macroblock operation 338.

During the above referenced scale one field operation 334, field/frame encoder 120 scales lines of a source area which correspond to one of the two fields of video information of the current frame and discards the lines of the source area which correspond to the other of the two fields of video information of the current frame. For example, video source 110 includes memory for storing lines of a source area of a frame of video. The odd lines of a source area of the frame of video correspond to one field of the frame, and the even lines of the source area correspond to another field of the frame. In one embodiment, field/frame encoder 120 scales the even lines and discards the odd lines during scale one field operation 334. In another embodiment, field/frame encoder 120 scales the odd lines and discards the even lines during scale one field operation 334. Control then transitions from scale one field operation 334 to encode macroblock operation 338.

During the above referenced scale two fields operation 336, field/frame encoder 120 scales all lines of a source area which is currently being processed in the current frame. For example, the odd lines of a source area of the frame of video correspond to one field of the frame, and the even lines of the source area correspond to another field of the frame. Field/frame encoder 120 scales the odd and even lines corresponding to the two fields. No lines of the memory are discarded during scale two fields operation 336. Control then transitions from scale two fields operation 336 to encode macroblock operation 338.

During encode macroblock operation 338, the CIF frame image is encoded on a macroblock-by-macroblock basis from each source area until all 396 macroblocks (as provided for by the H.261 and H.263 standards) are encoded. Various motion estimation techniques are used in encoding the macroblocks. For example, many video encoders perform motion search algorithms on the input frames to produce motion vectors for blocks of a frame in compliance with common video compression standards. The motion vectors represent a calculated estimation of an amount that the current image block has moved relative to a previous frame.

After process video information operation 330 and during determine motion content operation 340, the motion content of the video information is determined. The motion content of the video information (e.g., of a macroblock of video) is determined using one of the many motion detection techniques currently in use and well known in the art, such as a motion search algorithm implemented during encode macroblock operation 338. During motion decision 342, field/frame encoder 120 determines if the currently processed macroblock of video information includes motion. Thus, for example, field/frame encoder 120 determines if motion vectors were included in the encoding of the current macroblock during encode macroblock operation 338. If field/frame encoder determines that motion vectors were included in the encoding of the video information, control transitions from motion decision 342 to increment motion count operation 344. During increment motion count operation 344, a motion counter and/or motion count value is incremented to track and identify the number of macroblocks of the current frame which contain motion. Thus, the total number of macroblocks encoded with motion vectors since the last initialization is determined. After increment motion count operation 344, control transitions to macroblocks processed decision 350 (shown in FIG. 3B). If motion is not detected during motion decision 342, control transitions from motion decision 342 to macroblocks processed decision 350.

Figure 3B:
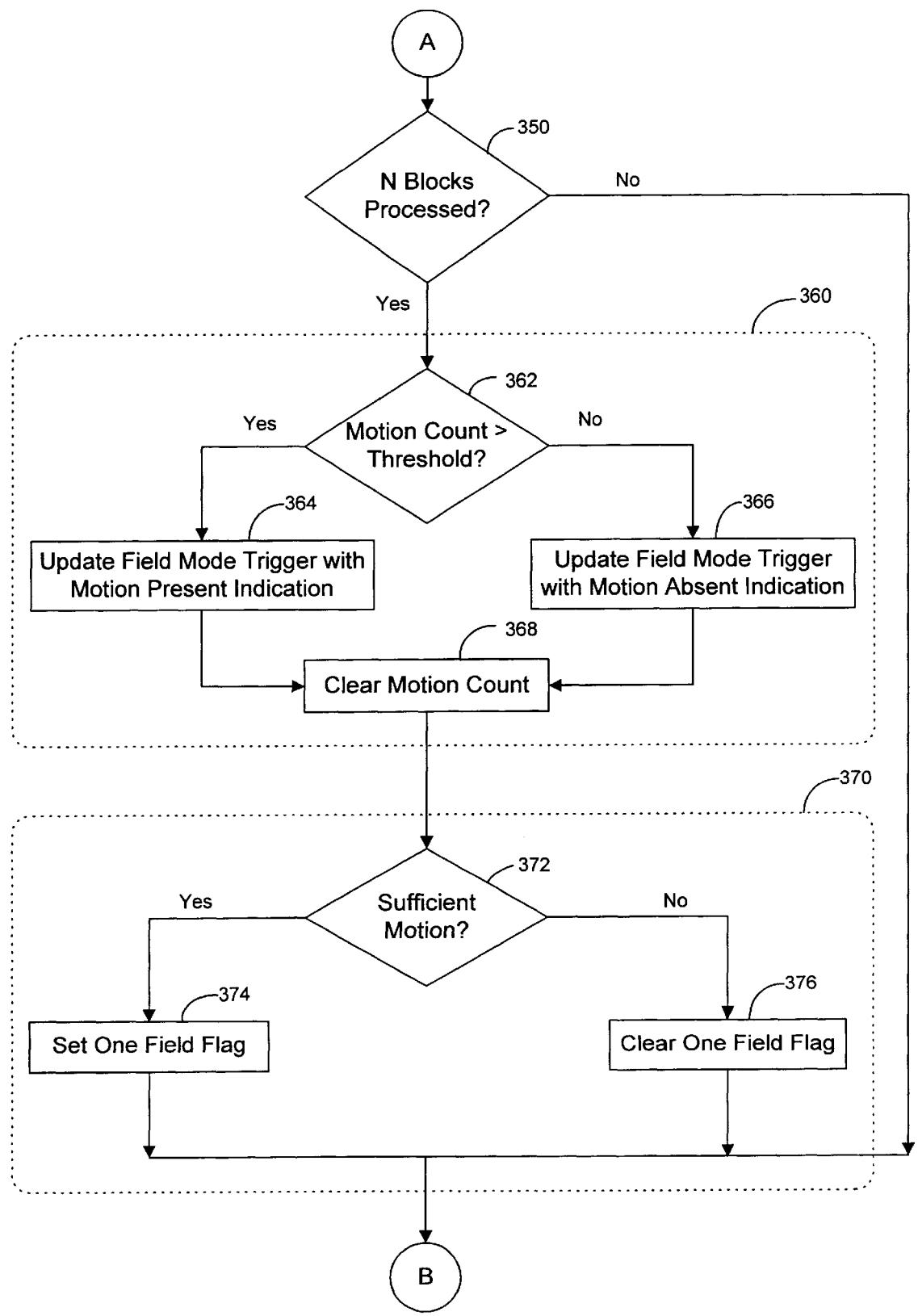

Referring to FIG. 3B, after determine motion content operation 340 and during macroblocks processed decision 350, field/frame encoder 120 determines if enough macroblocks of video information have been processed to determine a statistically relevant measurement of the motion content of an area (e.g., a frame, a group of blocks, or a macroblock) of video. For example, field/frame encoder 120 determines if a programmable number N macroblocks have been processed. A counter or memory location may be allocated for tracking the number of blocks processed. If not enough macroblocks of video information have been processed, further video information is received during receive video information operation 320. If enough macroblocks of video information have been processed, control transitions to comparison operation 360.

After decision 350 and during comparison operation 360, the motion content of the video information is compared to a motion content threshold and a field mode trigger is updated responsive to the comparison. Specifically, during motion count greater than threshold decision 362, field/frame encoder 120 determines if the motion counter holds a value greater than a programmable motion count threshold. The field mode trigger is then updated to indicate the result of the comparison.

If the motion counter holds a value greater than the motion count threshold, control transitions to update field mode trigger operation 364 during which the field mode trigger is updated with a motion present indication. For example, the field mode trigger is a multibit value (e.g., 4 or 8 bits) wherein the least significant bit represents the most recent motion content and the most significant bit represents the least recent motion content. The more significant bits are retained in the value of the field mode trigger to implement hysteresis and to provide historical information regarding multiple past frames for use in switching between field-based and frame-based scaling. During an update of the field mode trigger, the bits of the field mode trigger are shifted left and the outcome ("1") is OR'd with the least significant bit of the field mode trigger.

If the motion counter holds a value less than the motion count threshold, control transitions to update field mode trigger operation 366 during which the field mode trigger is updated with a motion absent indication. For example, the bits of the field mode trigger are shifted left and the outcome ("0") is OR'd with the least significant bit of the field mode trigger.

After either one of update field mode trigger operations 364, 366, control transitions to clear motion count operation 368 during which the motion counter and/or motion count value is cleared.

After comparison operation 360 and during reevaluate scaling technique operation 370, the scaling technique (e.g., field-base or frame-based scaling) is reevaluated to ensure that the scaling technique being used is consistent with the level of motion in the video to provide a high quality video image. Specifically, during sufficient motion decision 372, field/frame encoder 120 determines if the field mode trigger has a value indicating that at least a certain amount of motion is present in the processed video. If the field mode trigger has a value indicating that at least a certain amount of motion is present in the processed video, control transitions to set one field flag operation 374 during which the one field flag is set to a value indicating that field/frame encoder 120 should use field-based scaling. If the field mode trigger has a value indicating that a certain amount of motion is not present in the processed video, control transitions to clear one field flag operation 376 during which the one field flag is cleared to a value indicating that field/frame encoder 120 should use frame-based scaling.

The field mode trigger uses hysteresis based on prior processing to prevent frequent and unnecessary switching between field-based and frame-based scaling. For example, the field mode trigger has five bits indicating the motion level of the last five processed frames or number of macroblocks. The field mode trigger is AND'd with a mask variable including a series of least significant similar bits. The length of the series of similar bits determines the amount of hysteresis. For more hysteresis and less frequent switching from field-based scaling to frame-based scaling, a longer series of "1" bits is used for the mask value. The one field flag is set to "1" if the AND of the mask variable and the field mode trigger is non-zero. Thus, for less hysteresis and more frequent switching from field-based scaling to frame-based scaling, a longer series of "1" bits is used for the mask value. A different mask variable may be used to provide hysteresis for switching from frame-based scaling to field-based scaling.

After either one of set one field flag operation 374 and clear one field flag operation 376, control transitions to the receive video operation 320 described above.

Field/frame encoder 120 monitors the number of macroblocks in a frame of video which are found to contain motion and switches from scaling one field to two fields (or vice versa) based on a programmable threshold of macroblocks in motion in a frame. The switch between scaling one field (i.e., field scaling) and scaling two fields (i.e., frame scaling) can be done on a frame-by-frame basis, or on some sub-grouping of blocks within a frame (e.g., a group of blocks (GOBs) of the H.261 or H.263 standards), or on a block-by-block basis. Hysteresis can be utilized to avoid false transitions at the boundary conditions avoiding useless, rapid transitions.

Other relevant information such as the motion of some or all of the adjacent macroblocks or sub-macroblocks around the current macroblock or sub-GOB in the same frame may be used to determine when to switch between field and frame scaling at either the frame, GOB, macroblock, or sub-macroblock level. In one embodiment, the use of such other relative information is used independently of the above described approach of using motion detected by reference to prior frame(s). In another embodiment, the use of such other relative information is used in combination with the above described approach of using prior frame(s).

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, video source 110 may be any source of video such as a memory, a microprocessor (e.g., for PC graphics) or an NTSC, PAL, SECAM or other type camera. In one embodiment, video source 110 is a memory including storage for video information for each pixel of a frame of video. In one embodiment, field/frame encoder includes the memory. In one embodiment, the video source is an NTSC video source, for example, and the scaling is performed as part of the function of encoder 120. Video source 110 may be a local source or a remote source. Video source 110 may be a digital or analog source.

Coupling 115 may be a local or remote connection or network. Coupling 125 may be a local coupling such as a cable to a decoder, video display and/or other device, or a remote coupling such as a network or direct line coupling to remote decoders, displays, etc.

Although the above description refers to the processing of macroblocks of video information of a frame, such is not meant to be a limiting example of the invention. Although macroblocks, frames, etc. are referenced in the above description, any area, region and/or array of a video image, or a subset or superset thereof, may be processed in place of the above mentioned macroblocks, frames, etc. For example, a region may be any two dimensional video space such as a macroblock.

One exemplary information processing system 100 is a videoconference system. Digital video processing in accordance with the invention is performed in a videoconference environment including point-to-point and/or multipoint videoconferencing systems. An exemplary videoconference environment is described in U.S. patent application Ser. No. 09/057,849, filed on Apr. 9, 1998, entitled "Primary Transmission Site Switching in a Multipoint Videoconference Environment Based on Human Voice", naming Joon Maeng, Paul V. Tischler and Bill Clements as inventors, and which is incorporated herein by reference.

In one embodiment, a software module includes the operations of a method for processing video information in accordance with the invention. Various embodiments of the invention may use software or non-software based control methods such as application specific hardware and/or firmware implementations.

In one embodiment, information processing system 100 includes a computer system such as a personal computer system. In other embodiments, information processing system 100 is a microprocessor, digital signal processor (DSP) or microcontroller. In another embodiment, information processing system 100 is a software module operating on a computer system, microprocessor or microcontroller. In another embodiment, information processing system 100 is an application specific hardware module or firmware module. In another embodiment, information processing system 100 includes some combination of some or all of the above described embodiments.

In one embodiment, field/frame encoder 120 is a hardware module including an integrated circuit, discrete components, or some combination thereof. In another embodiment, field/frame encoder 120 is a software module executing on an information processing system such as a microprocessor, microcontroller or computer system. For example, in one embodiment, field/frame encoder 120 includes a video encoder microprocessor executing a software module. An exemplary video encoder microprocessor is the Vision Compression Processor (VCP) available from 8×8, Inc. of Santa Clara, Calif. In another embodiment, field/frame encoder 120 includes some combination of some or all of the above described embodiments.

Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit (e.g., a microprocessor), associated memory and a number of input/output (I/O) devices (e.g., a display, a data port, etc.). A computer system processes information according to a program and produces resultant output information via the I/O devices. A program is a list of internally stored instructions such as a particular application program and/or an operating system. A software module may include a program. The programs that control the operation of a computer system are commonly referred to as software applications or simply software.

Those skilled in the art will recognize that boundaries between logic blocks are merely illustrative and that alternative embodiments may merge logic blocks or impose an alternate decomposition of functionality upon various logic blocks. Similarly, the operations of the above description are for illustration only. Operations may be combined or the functionality of the operations may be distributed in additional operations in accordance with the invention.

The above description is not intended to present an exhaustive list of embodiments of the invention. Although an attempt has been made to outline some exemplary variations, other variations are within the scope of invention as defined in the claims below.

What is claimed is:

1. A method of processing video information, the method comprising:
    scaling the video information using a first number of fields if a field indicator indicates the first number of fields;
    scaling the video information using a second number of fields if the field indicator indicates the second number of fields;
    searching the video information for motion;
    setting the field indicator to indicate the first number of fields if the video information includes a first amount of motion; and
    setting the field indicator to indicate the second number of fields if the video information includes a second amount of motion.
2. The method of claim 1, wherein
    the first number is one; and
    the second number is two.
3. The method of claim 1 further comprising:
    initializing the field indicator to indicate the first number of fields before scaling the video information.
4. The method of claim 1 wherein
    the searching the video information for motion comprises:
        generating motion vectors for describing the motion of the video information for encoding the video information;
        determining the number of motion vectors generated in a third number of macroblocks; and
    the field indicator is set to indicate the first number of fields if more than a fourth number of motion vectors are generated; and
    the field indicator is set to indicate the second number of fields if less than the fourth number of motion vectors are generated.
5. The method of claim 4, wherein the third number of macroblocks comprises a video frame.
6. The method of claim 1 wherein
    the searching the video information for motion comprises:
        encoding macroblocks of the video information using motion vectors;
        determining whether each frame includes motion by determining if a number of motion vectors generated in each frame of the video information is greater than a motion threshold;
        setting a field mode trigger to indicate whether at least one most recent past frame includes; and wherein
    the field indicator is set to indicate the first number of fields if the at least one most recent past frame includes motion.
7. The method of claim 6 wherein
    the field mode trigger is a first field mode trigger;
    the first field mode trigger indicates whether each of a first plurality of most recent past frames includes motion;
    the searching the video information for motion further includes setting a second field mode trigger to indicate whether each of a second plurality of most recent past frames includes no motion;
    the field indicator is set to indicate the first number of fields if each of the first plurality of most recent past frames includes motion; and
    the field indicator is set to indicate the second number of fields if each of the second plurality of most recent past frames includes no motion.
8. A method of processing video information, the method comprising:
    setting a field indicator to one of a first value indicating one field and a second value indicating two fields;
    receiving video formatted according to frames, each frame including a first field and a second field;
    processing a number of fields of a first frame of the video, the number of fields being dependent upon whether the field indicator has the first value or the second value;
    setting the field indicator to the first value if the video includes more than a first amount of motion; and
    setting the field indicator to the second value if the video includes less than the first amount of motion.
9. The method of claim 8 wherein the processing the number of fields includes scaling the number of fields.
10. The method of claim 9 wherein the processing the number of fields includes deinterlacing the number of fields.
11. The method of claim 8 wherein the processing the number of fields includes deinterlacing the number of fields.
12. The method of claim 8 wherein
    the processing the number of fields includes encoding the first frame to provide a plurality of regions of pixels, the encoding the first frame including generating a motion vector for each region which includes motion; and
    the method further includes
        initializing a motion count value;
        incrementing the motion count value for each motion vector generated;
        determining if a minimum number of regions have been encoded;
        comparing the motion count value to a motion threshold value if the minimum number of regions have been encoded;

updating a field mode trigger to indicate motion in the first frame if the motion count value is greater than the motion threshold value;

updating a field mode trigger to indicate no motion in the first frame if the motion count value is less than the motion threshold value;

resetting the motion count value after updating the field mode trigger; and wherein the field indicator is set to the first value if the field mode trigger indicates motion in the first frame; and the field indicator is set to the second value if the field mode trigger indicates no motion in the first frame.

13. A method of processing video information, the method comprising:

initializing a field flag to a first value;

initializing a motion counter value;

receiving video for processing, the video being formatted according to frames, each frame including first and second fields;

scaling using a first number of fields of the received video to a first region, the first number being determined by the field flag;

encoding the first region of the video;

determining if the first region includes motion;

changing the motion counter value to indicate whether the first region includes motion;

determining a number of regions processed of a frame;

determining if the motion counter value indicates an amount of motion in the frame greater than a motion threshold if the number of regions processed of a frame exceeds a minimum regions processed threshold;

reinitializing the motion counter value if the number of regions processed of a frame exceeds a minimum regions processed threshold;

updating the field flag to one of the first value and a second value if the motion counter value is greater than the motion count threshold; and updating the field flag to the other of the first value and the second value if the motion counter value is less than the motion count threshold.

14. The method of claim 13, the method further comprising:

updating the field flag to the first value if the motion count is greater than the motion count threshold, the first value indicating a first number which is a number of frames conducive to provide a high quality motion image;

updating the field flag to a second value if the motion count is less than the motion count threshold, the second value indicating a first number which is a number of frames conducive to provide a high quality static image.

15. The method of claim 14 wherein the first value indicates that the first number is one; and the second value indicates that the first number is two.

16. The method of claim 13 wherein the minimum regions processed threshold is equal to the number of regions to represent a frame of video information.

17. An apparatus for processing video information, the apparatus comprising:

a computer-readable storage medium; and a scaling module stored on the computer-readable storage medium, the scaling module for scaling the video information using a first number of fields if a field indicator indicates the first number of fields and scaling the video information using a second number of fields if the field indicator indicates the second number of fields;

a searching module, the searching module for searching the video information for motion after scaling the video information;

a field indicator setting module, the field indicator setting module for setting the field indicator to indicate the first number of fields if the video information includes a first amount of motion, and for setting the field indicator to indicate the second number of fields if the video information includes a second amount of motion.

18. The method of claim 1, wherein the video information is searched for motion after scaling the video information.

19. The method of claim 1, wherein the video information is searched for motion before scaling the video information.

20. The method of claim 1, wherein the video information is searched for motion during scaling the video information.

* * * * *